(12) United States Patent
Wigell

(10) Patent No.: US 7,996,012 B2
(45) Date of Patent: Aug. 9, 2011

(54) METHOD AND APPARATUS FOR OPTIMISING THE SENDING OF TONES/ANNOUNCEMENTS DURING TANDEM-FREE OPERATION (TFO)

(75) Inventor: Toomas Wigell, Espoo (FI)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1066 days.

(21) Appl. No.: 11/721,230

(22) PCT Filed: Dec. 16, 2004

(86) PCT No.: PCT/EP2004/053543
§ 371 (c)(1),
(2), (4) Date: Jun. 8, 2007

(87) PCT Pub. No.: WO2006/063622
PCT Pub. Date: Jun. 22, 2006

(65) Prior Publication Data
US 2009/0233608 A1    Sep. 17, 2009

(51) Int. Cl.
*H04W 4/00* (2009.01)

(52) U.S. Cl. ........ 455/445; 455/560; 455/433; 370/465; 370/509; 370/522

(58) Field of Classification Search .......... 370/465, 370/509, 522; 455/445, 560, 433
See application file for complete search history.

(56) References Cited

U.S. PATENT DOCUMENTS

| 6,108,560 | A  | * | 8/2000 | Navaro et al. | 455/517 |
| 2001/0019958 | A1 | * | 9/2001 | Delfs et al. | 455/445 |
| 2003/0065507 | A1 | * | 4/2003 | Gerlach | 704/212 |

* cited by examiner

*Primary Examiner* — Pierre-Louis Desir

(57) ABSTRACT

A method and telecommunications node for implementing Tandem-Free Operation (TFO) between a pair of TFO partners in a telecommunications network. At call setup, a TFO negotiation is performed between the partners. Thereafter, if TFO is interrupted in at least one direction, state information and synchronization of the sending and/or receiving partner is maintained in the interrupted direction. An interruption may occur, for example, if a tone or announcement is to be sent. At the end of the interruption, sending and receiving of TFO frames is resumed with the same phase that was present before the interruption.

16 Claims, 4 Drawing Sheets

METHOD AND APPARATUS FOR OPTIMISING THE SENDING OF TONES/ANNOUNCEMENTS DURING TANDEM-FREE OPERATION (TFO)

FIELD OF THE INVENTION

The present invention relates to a method and apparatus for optimising Tandem-Free Operation in a telecommunications network. More particularly, the invention relates to a method and apparatus for facilitating fast re-establishment of Tandem-Free Operation following a temporary connection break.

BACKGROUND TO THE INVENTION

Considering a typical Global System for Mobile communications (GSM) call connection scenario involving a mobile-to-mobile call, speech data is efficiently encoded at each of the mobile terminals, for example using Adaptive Multi-Rate (AMR) or Enhanced Full-Rate coding which compresses voice data to a rate of, for example, 12.2 k/bits/s, for transmission over the radio interface to respective base stations. Certain equipment located within the network infrastructure, referred to as in-path equipment (IPE) may need to modify or "overwrite" the user speech data with some network generated data, e.g. a short voice announcement or tone. However, this equipment operates on a different coding scheme, typically Pulse Code Modulation (PCM) which compresses voice data at the higher rate of 64 kbits/s.

Provision must be made at the Base Station Controllers (BSC) or other nodes within the network infrastructure such as Media Gateways, for transcoding the compressed voice data between the radio interface compression standard and the network compression standard. Thus voice data is transcoded twice, once from the radio interface compression standard to the network compression standard, the "forward" direction, and once in the reverse direction. Each transcoding step impacts on the quality of the voice signal.

The transcoding entities implemented at or associated with the BSCs are referred to as transcoding units or "TRAUs". A TRAU may be implemented as a separate entity or together with a BSC. Transcoders (referred to as "TCs") may exist at other locations within the network, for example at core network boundaries. In some call scenarios, multiple transcoders may be located within the call path.

In order to address the problem of degradation of speech quality due to multiple transcoding stages, a scheme known as Tandem-Free Operation (TFO) has been introduced to GSM and to other mobile communication standards including CDMA and WCDMA based standards. TFO uses the principle that a number of least significant bits of PCM speech samples of the network coded data can be "stolen" to provide an in-band channel for transporting the radio interface coded (AMR or EFR) data. Stolen bits (one every $16^{th}$ speech sample) also provide a channel for transporting signalling information associated with TFO, e.g. for the purpose of negotiating TFO operation between TFO partners. The remaining bits of the network coded data can still be used if necessary for fast fall-back to PCM by the reverse transcoder, for example if the TFO operation is suspended to allow the playing of a network announcement. For a short period whilst TFO operation is suspended, the quality of any mobile-to-mobile voice data will be degraded. The latest 3GPP specification for TFO (applicable to both GSM and UMTS) is TS 28.062 V5.4.0, see in particular chapter 4.2.

TFO operation must be negotiated by TFO partners (TRAUs and TCs). In the case of GSM, these would be located within the Base Station Subsystem (BSS) serving respective mobile terminals, or at Media Gateways located at core network interfaces. The TFO partners must establish that the call is mobile-to-mobile and that both mobile terminals are utilising the same codec. As there may be IPEs located in the network between the two TFO partners, the TFO negotiation must ensure that these are transparent to the TFO messages and frames. FIG. 1 illustrates schematically the nodes involved in TFO operation.

Considering TFO in more detail, a call is first initiated in the normal way, with the control plane inserting transcoders into the call path where necessary. Transcoding between the radio interface data and PCM starts immediately at the transcoders following call set-up. The Initial TFO protocol negotiation then starts between the TFO partners, with TFO messages being inserted in the LSBs of the PCM stream data bytes. First up to three TFO_FILL messages are sent to pre-synchronize potential IPEs into a transparent mode for TFO_Messages. Then the TFO protocol partners exchange information about their codec types and configurations by means of TFO_REQ and TFO_ACK messages. If the codec types and configurations are compatible the TFO connection will be established. TFO protocol then sends a TFO_TRANS message to switch the potential IPEs into transparent mode for TFO_Frames. TFO partners can now begin sending TFO frames with compressed speech as payload in the LSBs of the PCM signal. After any IPEs became transparent, a TFO partner will begin receiving TFO frames from the peer TFO partner and will stop its own encoder and start to use the parameters of the compressed speech that it receives in the TFO_Frames rather than the PCM coded data.

Both TFO_Messages and TFO_Frames contain synchronisation and signalling bits. In addition, they contain a so-called "Keep_Open_Indication", which is a signal to the IPEs to stay in transparent mode. The Keep_Open_Indication consists of a "0" bit in the LSB of the PCM signal every 160 samples (20 ms).

The signalling flow involved in negotiating and maintaining TFO operation is illustrated in FIG. 2.

The setup of the TFO connection takes between 1 and 2 seconds, depending on the number of IPEs in the call path and certain other factors. This time is measured from the start of the first TFO_FILL message until the first TFO Frame is received. The setup time may be slightly different for the two directions.

When the call control layer requests the sending of a tone or an announcement on a link with an established TFO connection, this is achieved simply by replacing the PCM+TFO_F-rame signal towards the distant TFO partner with a "pure" PCM signal of the tone or announcement, at the local TFO partner or at some IPE. The distant TFO partner will immediately detect the loss of TFO_Frame synchronisation and after a short while (about 40 ms) will start to use the received PCM signal and encode it into the compressed format that was used before the TFO break. The distant partner will stop sending TFO frames in the reverse direction, and the process will be repeated at the local partner, resulting in a breakdown in the TFO connection in both directions. After the tone/announcement sending is finished, the TFO protocol will re-establish the TFO connection.

SUMMARY OF THE INVENTION

Re-establishment of a TFO connection after the end of a tone or announcement is a relatively slow process if the TFO partners utilise the "normal" TFO protocol negotiation procedure detailed above, i.e. the initial TFO negotiation procedure. The duration of this "pre-TFO" time period depends mainly on the length of TFO_REQ and TFO_ACK messages and the number of IPEs in the TFO path. However, a rough estimate for this period might be from 1 to 2 seconds. During the time when TFO is not established the call connection is not lost, but the voice quality is somewhat degraded. The level of degradation depends upon the codec type and the used codec mode. In the case of the AMR-WB codec type, the absence of TFO is clearly audible as the audible speech bandwidth is then only 300 to 3400 Hz instead of 100 to 7000 Hz.

According to a first aspect of the present invention there is provided a method of implementing Tandem-Free Operation between a pair of Tandem-Free Operation partners in a telecommunication network, the method comprising:

at call setup, carrying out a Tandem-Free Operation negotiation between said partners to establish Tandem-Free Operation therebetween;

at interruption of Tandem-Free Operation in at least one direction, maintaining state information and synchronisation of the Tandem-Free Operation machine of the receiving and/or sending partner in the interrupted direction, for the duration of the interruption; and at the end of said interruption, resuming receipt and/or sending of the Tandem-Free Operation frames at said receiving and/or sending Tandem-Free Operation partner, with the same phase as was present prior to the interruption.

State information is required by a TFO partner to identify the current operating state, the actions required in that state, and what must be done when a state change is required. Maintaining synchronisation during the interruption will normally require that the TFO machine maintain a knowledge of the current position in the sent or received data stream, e.g. in the PCM stream. This could be done using a bit counter. At the end of the interruption, the TFO partner can start to send or receive TFO messages and frames at the correct positions within the data stream without the need for resynchronisation.

Embodiments of the present invention allow fast re-establishment of TFO operation at the end of an interruption, avoiding the need to repeat the full TFO negotiation procedure.

Considering the direction in which the connection is interrupted, for example by the playing of a tone or an announcement, Tandem-Free Operation may be frozen at one or both of the local and distant Tandem-Free Operation partners. Said step of maintaining synchronisation of the Tandem-Free Operation machine happens upon freezing of the Tandem-Free Operation.

In the event that the interruption is instigated by the local Tandem-Free Operation partner, the operation of this partner may be frozen after interruption. This can be a two step process involving first freezing the Tandem-Free Operation sending process and subsequently freezing the Tandem-Free Operation receiving process. At the end of the interruption, the local partner enters the "operation" state and Tandem-Free Operation frame sending is resumed.

Preferably, during interruption, the local Tandem-Free Operation partner continues to signal to any In-Path-Equipment in the Tandem-Free Operation connection path to keep the path Tandem-Free Operation transparent. More preferably, this is done by the sending of "Keep-Open-Indication" signals.

In an alternative embodiment of the invention, the Tandem-Free Operation of the local partner is only suspended in the sending direction. Operation is maintained in the receiving direction. The distant partner is arranged to recognise the interruption and suspend Tandem-Free Operation only in the receiving direction. More preferably, the local partner sends signalling to the distant partner to indicate that the Tandem-Free Operation receiving operation should be frozen. Preferably this signalling is "Keep-Open-Indication" signals.

In another alternative embodiment of the invention, the interruption to the Tandem-Free Operation connection is instigated by an In-Path-Equipment. In this case, only the Tandem-Free Operation receive operation of the distant Tandem-Free Operation partner need be frozen.

TFO partners with TFO protocol functionality may be implemented inside the Base Station Subsystem (BSS) within the TRAU entity, or within a Core network in Media Gateways (MGWs) together with transcoder (TC) entities.

According to a second aspect of the present invention there is provided a method of operating a node of a telecommunication network, which node implements the Tandem-Free Operation so as to be able to act as a Tandem-Free Operation partner in a Tandem-Free Operation connection, the method comprising:

maintaining a Tandem-Free Operation state machine at the node in respect of a Tandem-Free Operation connection;

upon interruption of said connection, maintaining Tandem-Free Operation state information and synchronisation of the Tandem-Free Operation machine in the interrupted direction; and at the end of said interruption, resuming sending and/or receiving of the Tandem-Free Operation frames with the same phase as was present prior to the interruption.

According to a third aspect of the present invention there is provided a method of operating an In-Path Equipment node of a telecommunications network, the method comprising, upon interruption of a Tandem-Free Operation connection traversing the In-Path Equipment node, adding signalling to outgoing voice data to indicate to a distant Tandem-Free Operation partner that it should maintain Tandem-Free Operation state information and synchronisation of its Tandem-Free Operation machine.

Other aspects of the invention are set out in the appended claims.

DETAILED DESCRIPTION OF CERTAIN EMBODIMENTS

Figure 1:
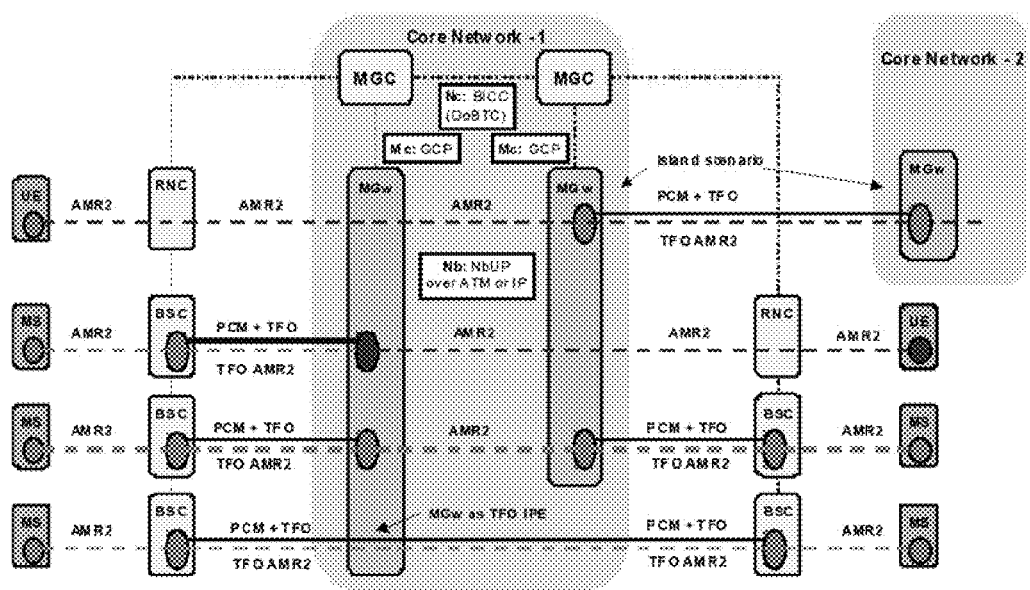
FIG. 1 illustrates schematically certain nodes present in a call path between mobile terminals.
Figure 2:
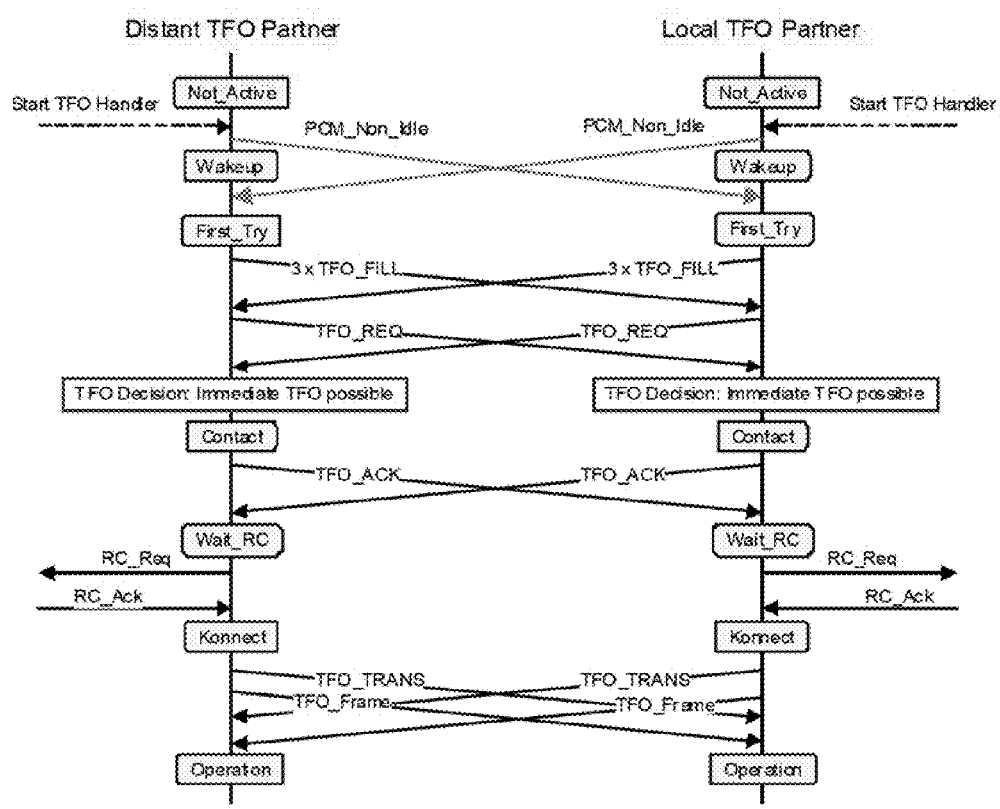
FIG. 2 illustrates signalling associated with TFO negotiation in a telecommunications network.

The procedures described here provide for fast re-establishment of a TFO connection after a temporary TFO connection break. This is achieved by effectively "freezing" the TFO protocol state of an established TFO connection at one or both of the TFO partners during the temporary TFO connection break. Upon completion of the event which caused the TFO connection break, e.g. after the tone or announcement has been played, the TFO connection can be re-established with minimal delay.

If the connection path includes In-Path Equipments (IPEs), the solution is enhanced by continuing to send the "Keep_Open_Indication" during the temporary TFO connection breaks. This has the effect of maintaining transparency of the IPEs even though no TFO_Frames are present.

The procedure will now be considered in more detail, firstly for the case where there are no IPEs in TFO connection path. This assumes that the tone or announcement which causes the TFO connection to be interrupted is initiated at one of the TFO partners. For example, this partner may be a Media Gateway, with the other partner being another Media Gateway or BSC. The Media Gateway at which the tone or announcement is initiated is referred to here as the "local" TFO partner, whilst the other partner is referred to as the "distant" partner.

Immediately prior to the tone or announcement sending, both TFO partners are in TFO protocol state "Operation". When the local side is required to send a tone or an announcement towards the distant side, the local TFO partner suspends sending PCM+TFO frames and sends the tone/announcement data in the PCM stream instead. It enters a "Freeze_Sending" state during which the TFO protocol sending direction is frozen. This is a newly defined state. The local TFO partner still receives TFO frames from the distant TFO partner until the distant TFO partner stops sending TFO frames. This latter event will occur after the third missing TFO frame towards the distant side (after the third missing TFO frame, the distant TFO partner will enter into the "Sync_Lost" state). After the third missing TFO frame towards the local side, the local TFO partner goes into another new state, "Freeze_Operation", where it switches to PCM mode and re-inserts a speech encoder into its receive direction. As for the distant TFO partner, some time after the third missing TFO frame, ca 300 ms, this TFO partner will proceed into the "Continuous_Retry" state and later ends up in "Periodic_Retry" state.

TFO frames are inserted into a PCM sample stream starting at a certain sample number and then repeated every 20 ms so that next TFO frame starts where the last stops: a chain of TFO frames. When TFO frame sending restarts after interruption, the positions of the TFO frames should be the same. In both "Freeze_Sending" and "Freeze_Operation" states the local TFO partner keeps its TFO protocol machine synchronized (scheduled) and ready to start sending TFO frames with the same phase at any time after the cause of the TFO interruption has been removed. In practice, the TFO machine continues to run during the pause, only it doesn't actually output TFO frames.

Upon completion of the tone sending, the TFO protocol state "Operation" is restored at the local side, and the local TFO partner resumes sending of TFO frames with the same phase as before the TFO break. The distant TFO partner receives a TFO frame while it is in the "Continuous_Retry" or "Periodic_Retry" state and acknowledges the situation back to the local TFO partner with TFO_DUP messages. At the same time, the local TFO partner notices that TFO frames (from the distant TFO partner) are missing and indicates the situation to the distant TFO partner with TFO_SYL messages and stops sending TFO frames after third missing TFO frame. After reception of a TFO_DUP message the local TFO partner resumes sending TFO frames. After reception of a TFO_SYL message and TFO frames, the distant TFO partner becomes operational and starts sending TFO frames.

Figure 3:
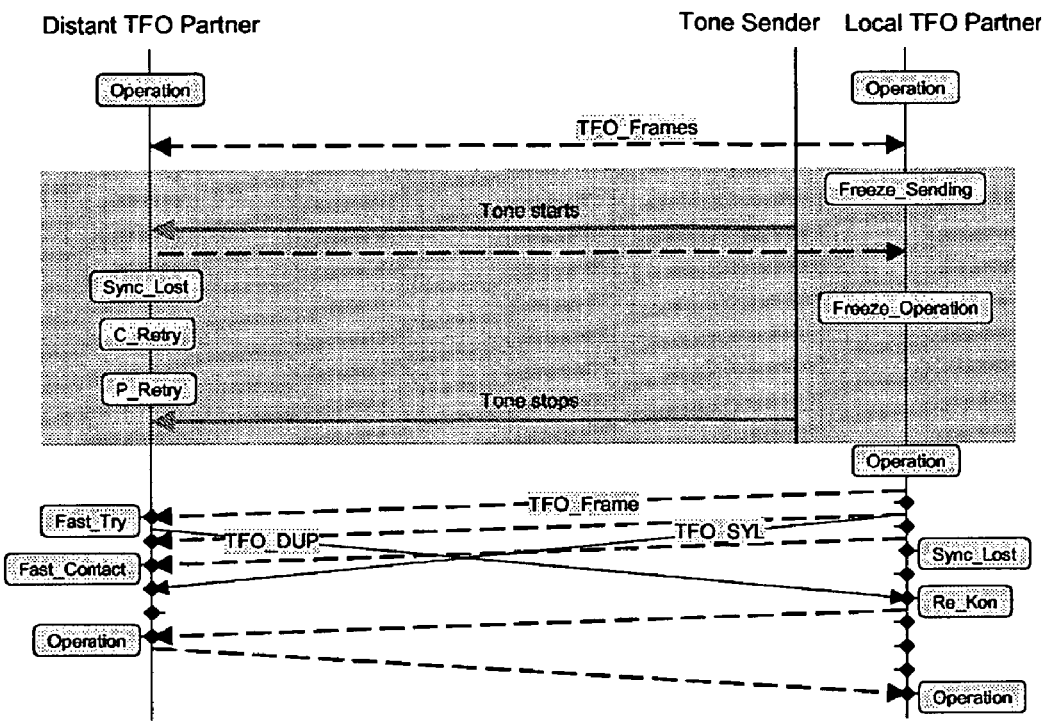
FIG. 3 illustrates signalling associated with a TFO fast re-establishment procedure.

The various re-establishment steps are illustrated in the signalling flow of FIG. 3. The skilled person will appreciate that The new procedure mimics to some extent a local handover procedure and re-uses protocol elements that are present inside the distant TFO partner (although intended for other purposes).

During the reestablishment period, the user terminals will receive voice data, although this will be of relatively low quality being derived from the PCM data. However, the re-establishment delay is now relatively short, and can be evaluated as follows (only transmission times of TFO messages and frames are considered):

For the distant TFO partner: TFO frame (20 ms)+TFO_DUP (60 ms)+TFO frame (20 ms)=100 ms, plus processing/scheduling times, which are in most cases small.

For the local TFO partner: TFO frame (20 ms)+TFO_DUP (60 ms)+2×TFO frame (40 ms)=120 ms, plus processing/scheduling times.

If there are IPEs in the TFO connection path, this solution will by itself not work because the TFO path might not be TFO-transparent when re-establishment is attempted, i.e. the IPEs will continue to block the TFO frames. However, IPEs towards the distant TFO partner can be kept TFO-transparent if the local TFO partner continues to send "Keep_Open_Indication" during the temporary TFO break. The "Keep_Open_Indication" is defined as a continuous bit stream of one "0"-Bit in the LSB of every $160^{th}$ PCM sample (every 20 ms), containing at least one "1"-Bit within the LSBs in the other 159 PCM samples. An alternative solution is to use TFO_FILL messages, instead of the "Keep_Open_Indication", in order to maintain TFO transparency of the IPEs. In some cases, this may be easier to implement.

Figure 4:
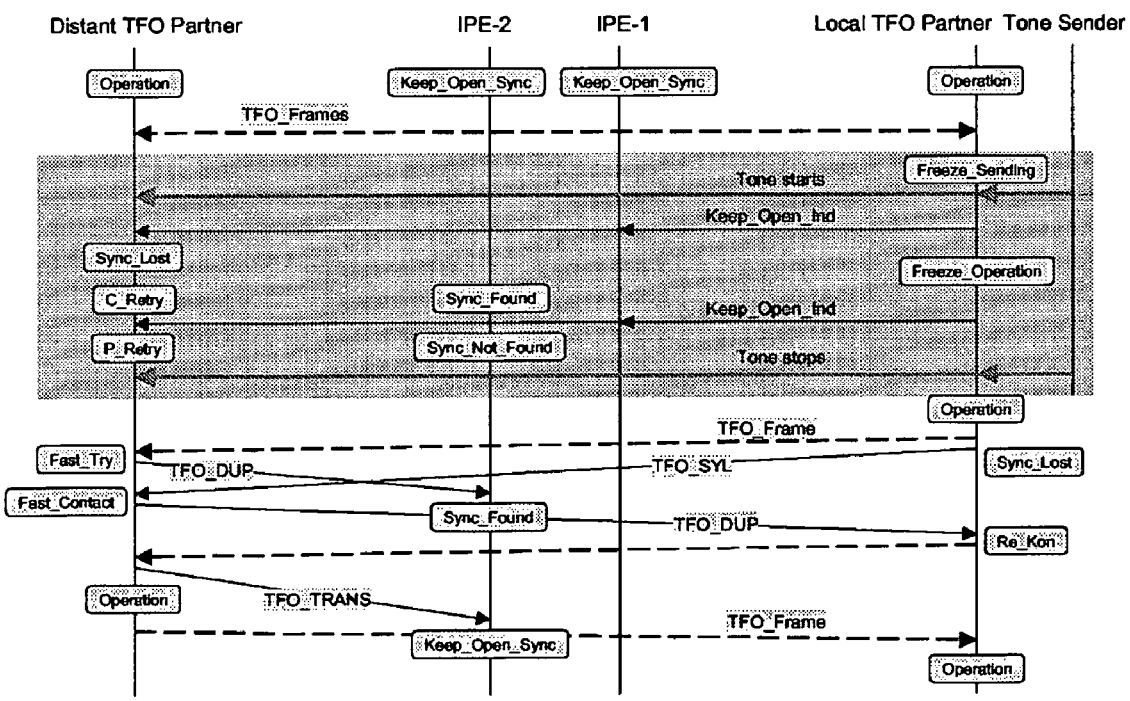
FIG. 4 illustrates signalling associated with a TFO fast re-establishment procedure where IPEs are present in the call path.

The modified approach where IPEs are present in the call path is illustrated by the signalling flow of FIG. 4, where the continued sending of "Keep_Open_Indication" during the interruption of the TFO connection keeps transparent the "IPE-1" which is in the path towards the distant TFO partner. The signalling flow assumes a worst case scenario in which the TFO break lasts so long that the distant TFO partner ends up in "Periodic_Retry" state, and the IPE-2 (towards local TFO partner) enters the "Sync_Not_Found" state. After end of the tone sending, the TFO protocol state "Operation" is restored and the local TFO partner resumes sending of TFO frames. The distant TFO partner receives the first TFO frame and places five TFO_DUP messages into its sending buffer. The first TFO_DUP is swallowed by the IPE-2 but it brings the IPE-2 into the state "Sync_Found", allowing the second TFO_DUP to traverse the IPE-2 and reach the local TFO partner.

After reception of the TFO_SYL message and then TFO frames by the distant TFO partner, this partner becomes operational and starts re-sending TFO frames. At the same time TFO_TRANS messages are sent from the distant TFO partner. The IPE-2 is TFO-non-transparent for TFO frames until it receives TFO_TRANS, after which the TFO frames can pass through the IPE-2.

The TFO connection re-establishment delay (again only transmission times of TFO messages and frames are considered) can be evaluated as follows:

For the distant TFO partner: TFO frame (20 ms)+2×TFO_DUP (120 ms)+TFO frame (20 ms)=160 ms, plus processing/scheduling times.

For the local TFO partner: TFO frame (20 ms)+2×TFO_DUP (120 ms)+TFO frame (20 ms)+

TFO_TRANS (100 ms)+TFO frame (20 ms)=280 ms, plus processing/scheduling times.

Whilst longer than the delays experienced when no IPEs are present in the connection path, these delays remain significantly less than the delays of 1 to 2 seconds experienced with the conventional approach to re-establishment.

The approaches described above assume that no changes are made to the existing TFO protocol. However, if the existing TFO protocol can be modified, then by using a special indication, e.g. "Keep_Open_Indication", the distant TFO partner as well as the local partner may be "Frozen" during a temporary TFO break. More particularly, the TFO protocol is modified such that the distant TFO partner will recognise a temporary TFO break by virtue of missing TFO frames but the presence of "Keep_Open_Indication". Upon recognising the break, the distant TFO partner places its TFO protocol machine into a new state "Freeze_Receiving" state. The distant TFO partner continues sending TFO frames. On the receiving side the distant TFO partner forwards received PCM samples containing the tone to the speech encoder. After the end of the tone, the TFO connection (for one direction only) is immediately re-established. As an alternative to the use of "Keep_Open_Indication" to freeze the distant TFO partner, the TFO control frame "Generic Configuration Frame" may be used instead.

This freezing of the distant TFO partner has the additional advantage that TFO_Frames may be sent backwards during the TFO break (half-duplex TFO), i.e. allowing the superior non-PCM data to be used in one direction whilst PCM data is used in the other direction.

Note that this solution requires a change to the existing TFO protocol because it requires a new TFO protocol procedure for handling the situation where TFO frames are missing but, at the same time, the temporary TFO break indication (e.g. "Keep_Open_Indication") is received.

Figure 5:
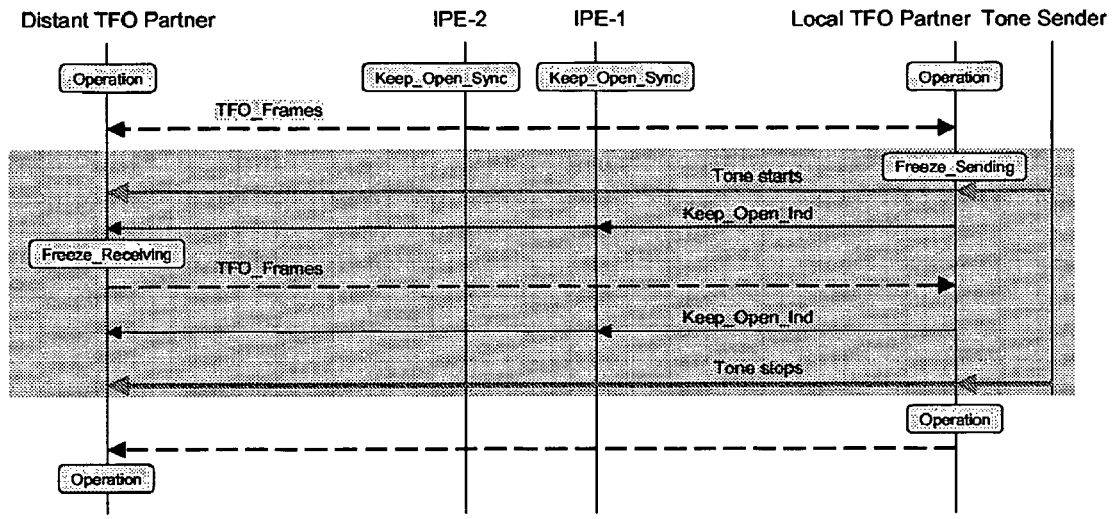
FIG. 5 illustrates signalling associated with a TFO fast re-establishment procedure where IPEs are present in the call path, according to an alternative embodiment of the invention.

FIG. 5 shows the signalling flow associated with this enhanced procedure.

Figure 6:
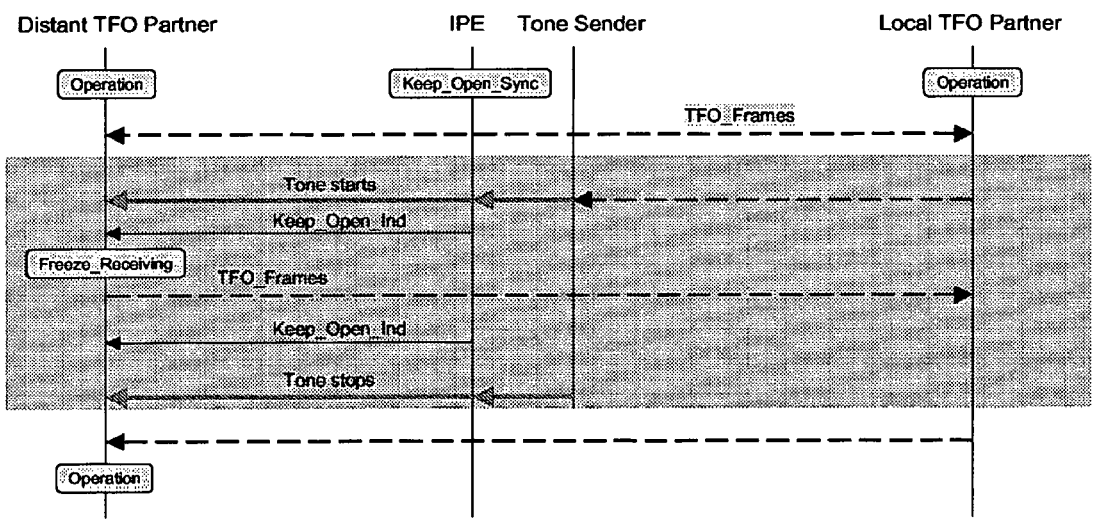
FIG. 6 illustrates signalling associated with a TFO fast re-establishment procedure where the an announcement/tone originates at an IPE.

The approaches described above assume, as has already been stated, that the entity playing the tone or announcement is co-located with one of the TFO partners, e.g. a Media Gateway. This may not always be the case. For example, this entity may be an IPE (located in a separate node or as a separate device in a node containing a TFO partner). FIG. 6 illustrates a signalling flow which may be used in this scenario. Here, the IPE continues to send the "Keep_Open_Indication" to the distant TFO partner after commencement of the tone. As with the procedure described with reference to FIG. 5, the distant TFO partner recognises this and enters the "Freeze-Receiving" state. Again, the local TFO partner is unaffected, and half-duplex TFO is maintained during the interruption. This implementation requires a change to the TFO functionality currently implemented in the IPE (see TS 28.062 V5.4.0, Annex B).

As with the scenario in which the interruption is initiated at the local TFO partner, where it is the IPE which initiates the interruption, the "Keep_open_Indication" sent by the IPE is used to maintain other IPEs, in the connection path between the IPE which initiates the interruption and the distant TFO partner, in a TFO transparent state, thus facilitating fast reestablishment of the TFO connection.

The person of skill in the art will appreciate that various modifications may be made to the above described embodiments without departing from the scope of the present invention.

The invention claimed is:

1. A method of implementing Tandem-Free Operation between a sending Tandem-Free Operation partner and a receiving Tandem-free partner in a telecommunication network, the method comprising:

at call setup, carrying out a Tandem-Free Operation negotiation between said partners to establish Tandem-Free Operation therebetween;

at interruption of Tandem-Free Operation in at least one direction, maintaining state information and synchronization of a Tandem-Free Operation state machine of the receiving and/or sending partner in the interrupted direction, for the duration of the interruption;

at the end of said interruption, resuming receipt and/or sending of the Tandem-Free Operation frames at said receiving and/or sending Tandem-Free Operation partner, with the same phase as was present prior to the interruption, wherein the interruption to the tandem-free operation connection is instigated by an in-path-equipment;

and further comprising, during interruption, sending signaling from the in-path equipment to the receiving Tandem-Free operation partner to indicate to that partner that state information and synchronization of the Tandem-Free Operation state machine in the receiving direction should be maintained.

2. A method according to claim 1, wherein, if the interruption is instigated by the sending Tandem-Free Operation partner, the state information and synchronization of the Tandem-Free Operation state machine of the sending partner in the interrupted direction is maintained for the duration of the interruption.

3. A method according to claim 2, wherein, during interruption, the sending Tandem-Free Operation partner continues to signal to In-Path-Equipment in the Tandem-Free Operation connection path to keep the path Tandem-Free Operation transparent.

4. A method according to claim 3, wherein the signalling is carried by "Keep-Open-Indication" signals.

5. A method according to claim 2, wherein the interrupted direction is the sending direction from the sending partner to the receiving partner, and the method further comprises suspending the Tandem-Free Operation of the sending partner in only the sending direction, while maintaining operation of the sending partner in the receiving direction, the receiving partner in the interrupted direction being arranged to recognize the interruption and suspend Tandem-Free Operation only in the receiving direction.

6. A method according to claim 2, further comprising freezing the Tandem-Free Operation of both partners in both directions, while maintaining the state information and synchronization of the Tandem-Free Operation state machines of both partners for the duration of the interruption.

7. A method according to claim 1, further comprising sending signalling to the receiving Tandem-Free Operation partner, following interruption, to indicate to the receiving Tandem-Free Operation partner to maintain state information and machine synchronization.

8. A method according to claim 7, wherein the signalling is "Keep-Open-Indication" signals.

9. A method according to claim 1, wherein the signalling is "Keep-Open-Indication" signals.

10. A method according to claim 1, wherein the Tandem-Free Operation partners are implemented with Tandem-Free Operation protocol functionality within a Base Station Subsystem with a TRAU entity, or within a Core network in Media Gateways having transcoder entities.

11. A method of operating a node of a telecommunication network, said node implementing Tandem-Free Operation to act as a Tandem-Free Operation partner in a Tandem-Free Operation connection, the method comprising:

maintaining a Tandem-Free Operation state machine at the node with respect to a Tandem-Free Operation connection;

upon interruption of said connection, maintaining Tandem-Free Operation state information and synchronization of the Tandem-Free Operation state machine in the interrupted direction;

at the end of said interruption, resuming sending and/or receiving of Tandem-Free Operation frames with the same phase as was present prior to the interruption, wherein the interruption to the tandem-free operation connection is instigated by an in-path-equipment;

and further comprising, during interruption, sending signaling from the in-path equipment to the receiving Tandem-Free operation partner to indicate to that partner that state information and synchronization of the Tandem-Free Operation state machine in the receiving direction should be maintained.

12. A method of operating an In-Path Equipment node of a telecommunications network, the method comprising:

detecting an interruption of a Tandem-Free Operation connection traversing the In-Path Equipment node;

adding signaling to outgoing data to indicate to a distant Tandem-Free Operation partner that the partner should maintain Tandem-Free Operation state information and synchronization of its Tandem-Free Operation state machine in the interrupted direction, wherein the interruption to the tandem-free operation connection is instigated by an in-path-equipment;

and further comprising, during interruption, sending signaling from the in-path equipment to the receiving Tandem-Free operation partner to indicate to that partner that state information and synchronization of the Tandem-Free Operation state machine in the receiving direction should be maintained.

13. A radio cell control node for use in a radio access network, the node comprising;

first processing means implementing the Tandem-Free Operation protocol for carrying out a Tandem-Free Operation negotiation with a peer Tandem-Free Operation partner to establish Tandem-Free Operation therewith;

second processing means arranged, at interruption of Tandem-Free Operation, to maintain state information and synchronization of the node's Tandem-Free Operation state machine in the interrupted direction and, at the end of said interruption, to resume sending and/or receiving of Tandem-Free Operation frames with the same phase as was present prior to the interruption, wherein the interruption to the tandem-free operation connection is instigated by an in-path-equipment;

and further comprising, during interruption, means for sending signaling from the in-path equipment to the receiving Tandem-Free operation partner to indicate to that partner that state information and synchronization of the Tandem-Free Operation state machine in the receiving direction should be maintained.

14. A node according to claim 13, wherein the node is selected from a Radio Network Controller and a Base Station Controller.

15. A Media Gateway of a telecommunications network, the Gateway comprising:

first processing means implementing the Tandem-Free Operation protocol for carrying out a Tandem-Free Operation negotiation with a peer Tandem-Free Operation partner to establish Tandem-Free Operation therewith;

second processing means arranged, at interruption of Tandem-Free Operation, to maintain state information and synchronization of the Gateway's Tandem-Free Operation state machine in the interrupted direction and, at the end of said interruption, to resume sending and/or receiving of Tandem-Free Operation frames with the same phase as was present prior to the interruption, wherein the interruption to the tandem-free operation connection is instigated by an in-path-equipment;

and further comprising, during interruption, means for sending signaling from the in-path equipment to the receiving Tandem-Free operation partner to indicate to that partner that state information and synchronization of the Tandem-Free Operation state machine in the receiving direction should be maintained.

16. An In-Path Equipment node of a telecommunications network, the node comprising;

first processing means for interrupting a Tandem-Free Operation connection between Tandem-Free Operation partners in at least one direction; and second processing means for adding signalling to data sent to a receiving Tandem-Free Operation partner in the interrupted direction, for the duration of the interruption, to identify to the Tandem-Free Operation partner that state information and synchronization of its Tandem-Free Operation state machine in the interrupted direction should be maintained, wherein the interruption to the tandem-free operation connection is instigated by an in-path-equipment;

and further comprising, during interruption, means for sending signaling from the in-path equipment to the receiving Tandem-Free operation partner to indicate to that partner that state information and synchronization of the Tandem-Free Operation state machine in the receiving direction should be maintained.

* * * * *